United States Patent
Murakami et al.

(10) Patent No.: US 9,505,082 B2
(45) Date of Patent: Nov. 29, 2016

(54) MANUFACTURING METHOD OF ELECTRIC STORAGE APPARATUS AND ELECTRIC STORAGE APPARATUS

(71) Applicant: GS Yuasa International Ltd., Kyoto-shi (JP)

(72) Inventors: Satoshi Murakami, Kyoto (JP); Shinsuke Yoshitake, Kyoto (JP); Tomonori Kishimoto, Kyoto (JP)

(73) Assignee: GS Yuasa International, Ltd., Kyoto-shi, Kyoto (JP)

( * ) Notice: Subject to any disclaimer, the term of this patent is extended or adjusted under 35 U.S.C. 154(b) by 110 days.

(21) Appl. No.: 14/420,405

(22) PCT Filed: Aug. 5, 2013

(86) PCT No.: PCT/JP2013/071176
§ 371 (c)(1),
(2) Date: Feb. 9, 2015

(87) PCT Pub. No.: WO2014/034385
PCT Pub. Date: Mar. 6, 2014

(65) Prior Publication Data
US 2015/0183052 A1   Jul. 2, 2015

(30) Foreign Application Priority Data
Aug. 28, 2012 (JP) ................. 2012-187154

(51) Int. Cl.
*B23K 20/10* (2006.01)
*H01M 2/26* (2006.01)
*H01M 2/30* (2006.01)

(52) U.S. Cl.
CPC ............. *B23K 20/10* (2013.01); *H01M 2/26* (2013.01); *H01M 2/30* (2013.01); *B23K 2201/38* (2013.01); *B23K 2203/18* (2013.01); *Y10T 29/49108* (2015.01)

(58) Field of Classification Search
CPC ........ H01M 2/26; H01M 2/30; B23K 20/10; B23K 2201/38; B23K 2003/18
See application file for complete search history.

(56) References Cited

U.S. PATENT DOCUMENTS 5,041,942 A   8/1991   Carrico
5,651,494 A   7/1997   Ogino et al.
(Continued)

FOREIGN PATENT DOCUMENTS

JP   59-046787 A   3/1984
JP   04-287906 A   10/1992
(Continued)

OTHER PUBLICATIONS

International Preliminary Report on Patentability (Chapter I) dated Mar. 12, 2015 with an English translation thereof.
(Continued)

*Primary Examiner* — Stewart Fraser
(74) *Attorney, Agent, or Firm* — McGinn IP Law Group, PLLC

(57) ABSTRACT

A metal foil extending outward from an electrode plate is sandwiched between a first metal member and a second metal member, and ultrasonic vibration is caused to act upon a plurality of sites of action from the first metal member side to join the metal foil to the first metal member and the second metal member. The first metal member has a Vickers hardness of at least 40 Hv and not more than 75 Hv.

4 Claims, 13 Drawing Sheets

(56) References Cited

U.S. PATENT DOCUMENTS

| | | |
|---|---|---|
| 2002/0061438 A1 | 5/2002 | Inoue et al. |
| 2008/0070111 A1 | 3/2008 | Abe et al. |
| 2011/0195286 A1 | 8/2011 | Aota et al. |
| 2012/0070720 A1 | 3/2012 | Aizawa et al. |
| 2012/0135285 A1 | 5/2012 | Iwama et al. |
| 2012/0264007 A1 | 10/2012 | Sasaki et al. |
| 2012/0264008 A1 | 10/2012 | Okamoto et al. |
| 2013/0052531 A1 | 2/2013 | Yoshitake et al. |
| 2013/0089769 A1* | 4/2013 | Proctor .................. H01G 11/42 429/127 |
| 2013/0157095 A1* | 6/2013 | Ariga .................... H01M 2/263 429/94 |

FOREIGN PATENT DOCUMENTS

| | | |
|---|---|---|
| JP | 06-155051 A | 6/1994 |
| JP | 08-252679 A | 10/1996 |
| JP | 10-244380 A | 9/1998 |
| JP | 11-077337 A | 3/1999 |
| JP | 2000-164195 A | 6/2000 |
| JP | 2001-038475 A | 2/2001 |
| JP | 2002-096180 A | 4/2002 |
| JP | 2003-197174 A | 7/2003 |
| JP | 2004-071199 A | 3/2004 |
| JP | 2004-106059 A | 4/2004 |
| JP | 2004-259547 A | 9/2004 |
| JP | 2007-305322 A | 11/2007 |
| JP | 2008-034356 A | 2/2008 |
| JP | 2009-105074 A | 5/2009 |
| JP | 2010-097764 A | 4/2010 |
| JP | 2010-097822 A | 4/2010 |
| JP | 2011-014276 A | 1/2011 |
| JP | 2011-115814 A | 6/2011 |
| JP | 2011-165437 A | 8/2011 |
| JP | 2012-035299 A | 2/2012 |
| JP | 2012-069268 A | 4/2012 |
| JP | 2012-079427 A | 4/2012 |
| JP | 2012-092419 A | 5/2012 |
| JP | 2012-113995 A | 6/2012 |
| JP | 2012-160311 A | 8/2012 |
| JP | 2013-065552 A | 4/2013 |

OTHER PUBLICATIONS

International Search Report (ISR) (PCT Form PCT/ISA/210), in PCT/JP2013/071176, dated Sep. 10, 2013.

* cited by examiner

MANUFACTURING METHOD OF ELECTRIC STORAGE APPARATUS AND ELECTRIC STORAGE APPARATUS

CROSS-REFERENCE TO RELATED APPLICATION

This application claims priority to Japanese Patent Application No. 2012-187154, the disclosure of which is incorporated herein by reference in its entirety.

FIELD

The present invention relates to a method for manufacturing an electric storage apparatus by sandwiching a metal foil extending outward from an electrode plate constituting an electrode assembly between a first metal member and a second metal member and causing ultrasonic vibration to act upon a plurality of sites of action from the first metal member side to join the metal foil to the metal members. The present invention relates also to an electric storage apparatus.

BACKGROUND ART

In general, an electric storage element of an electric storage apparatus includes electrode plates stacked in a layered manner, in order to improve electricity storage efficiency. As the wiring configuration of this electric storage element, metal foils extending outward from respective electrode plates are bundled and joined directly or indirectly to wiring members in many cases.

In this case, ultrasonic welding technology is widely used as the above-described technique of joining metal foils.

The above-mentioned metal foils are ultrasonic-welded not simply by causing ultrasonic vibration to act upon the metal foils. Specifically, the method of ultrasonic welding is as follows. As described in Patent Literature 1 cited below, a metal member (first metal member) is sandwiched between a tool (the leading end of a so-called horn) used to cause ultrasonic vibration to act upon the metal foil and the metal foil, and a metal member (second metal member) is also disposed on the opposite surface of the bundled portions of the metal foil. As described above, the bundled portions of the metal foil are sandwiched between the first metal member and the second metal member and, under that condition, ultrasonic vibration is caused to act upon the first metal member to join the metal foil to the metal members, thereby protecting the metal foil.

In addition, ultrasonic welding is performed in a plurality of places to secure a junction area, while avoiding an increase in the size of the leading end portion of the horn.

In the above-described conventional configuration, however, the metal member (first metal member) used to protect the metal foil may become damaged in some cases, as the result of ultrasonic welding being performed in a plurality of places.

That is, when ultrasonic vibration is caused to act upon the first metal member, the first metal member deforms in an undulating manner in the vicinity of each position for ultrasonic vibration to act upon. Thus, the above-mentioned deformations arising from both sides of adjacent positions become superimposed on each other between the two sites of action of ultrasonic vibration.

This superimposition of deformations on each other may in some cases result in such a degree of deformation as to produce cracks ascribable to the stress of the first metal member. If such cracks arise, the relative positional relationship between the first metal member and the metal foil shifts from a preferred positional relationship, thus leading to, for example, yield decline. Consequently, productivity may degrade in some cases.

CITATION LIST

Patent Literature

Patent Literature 1: JP 2004-071199 A

SUMMARY

Technical Problem

An object of the present invention, which has been accomplished in view such circumstances, is to prevent damage to a metal member as much as possible, even when ultrasonic welding is performed in a plurality of places while protecting a metal foil to be welded with the metal member.

Solution to Problem

A method for manufacturing an electric storage apparatus according to the present invention includes the steps of; sandwiching a metal foil extending outward from an electrode plate between a first metal member and a second metal member; and causing ultrasonic vibration to act upon a plurality of sites of action from the first metal member side to join the metal foil to the first metal member and the second metal member, wherein the first metal member has a Vickers hardness of at least 40 Hv and not more than 75 Hv.

One aspect of the method for manufacturing an electric storage apparatus according to the present invention may have a configuration, in which, in the joining step, a vibration tool that has a contact surface capable of contacting the first metal member and causes ultrasonic vibration to act upon the first metal member is used, and the contact surface is constituted by one or a plurality of projections.

Another aspect of the method for manufacturing an electric storage apparatus according to the present invention may have a configuration, in which end edges of the first metal member and the second metal member are coupled with each other by a joining section, and in the sandwiching step, the metal foil is sandwiched between the first metal member and the second metal member such that an end edge of the metal foil is in contact with the joining section.

An electric storage apparatus according to the present invention includes: an electric storage element including: an electrode assembly having a metal foil extending on one end side; and an auxiliary plate for ultrasonic welding that has a plurality of joining portions joined to the metal foil by ultrasonic vibration and is placed against the metal foil, wherein the auxiliary plate has a Vickers hardness of at least 40 Hv and not more than 75 Hv.

DESCRIPTION OF EMBODIMENTS

Figure 1:
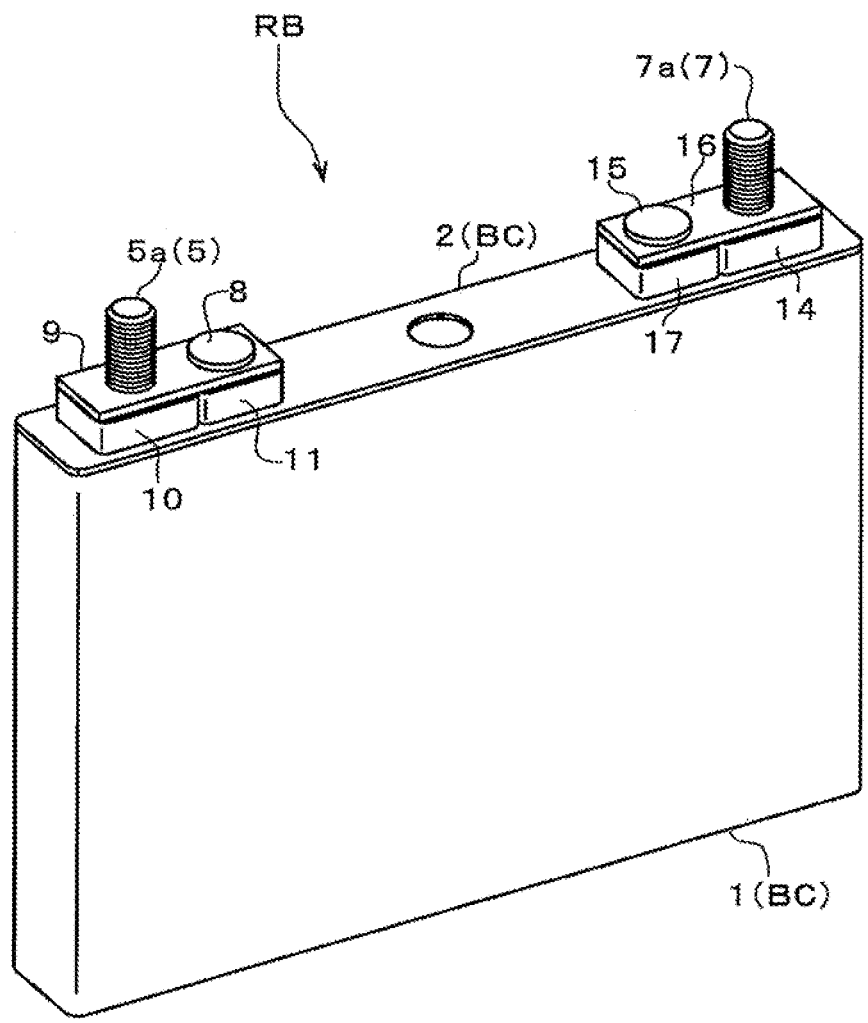
FIG. 1 is an external perspective view of an electric storage apparatus according to an embodiment of the present invention.

A method for manufacturing an electric storage apparatus according to the present invention includes the steps of: sandwiching a metal foil extending outward from an electrode plate between a first metal member and a second metal member; and causing ultrasonic vibration to act upon a plurality of sites of action from the first metal member side to join the metal foil to the first metal member and the second metal member, wherein the first metal member has a Vickers hardness of at least 40 Hv and not more than 75 Hv.

In this way, it is possible to prevent damage of the first metal member as much as possible by appropriately setting the Vickers hardness of the first metal member, even in the case where ultrasonic welding is performed at a plurality of points of the first metal member protecting the metal foil to be welded. A specific description is given below.

The bundled metal foil is sandwiched between the second metal member and the first metal member for protecting the metal foil to be welded having a Vickers hardness of at least 40 Hv and not more than 75 Hv, and ultrasonic vibration is caused to act upon the metal foil from the first metal member side to join the metal foil to the first and second metal members.

When the Vickers hardness of the first metal member is less than 40 Hv, the first metal member is excessively soft, so that a stress due to a relative displacement between each site of action which ultrasonic vibration is caused to act upon and the surroundings of the site increases. Therefore, damage such as cracks may possibly occur at the boundary between the site of action which ultrasonic vibration is caused to act upon and the surroundings of the site.

Therefore, vibration at the site of action which ultrasonic vibration is caused to act upon appropriately propagates circumferentially (to the surroundings) by setting the Vickers hardness of the first metal member to 40 Hv or more, and thus it is possible to prevent the occurrence of damage at the boundary between the site of action which ultrasonic vibration is caused to act upon and the surroundings of the site as much as possible.

On the other hand, even if deformations due to ultrasonic welding around adjacent sites of action of ultrasonic vibration become superimposed on each other in their midst from the application points on both sides, so that the deformations become significant, it is possible to prevent the occurrence of damage at the deformed sites, since the Vickers hardness of the first metal member is set to 75 Hv or less and thus the first metal member is appropriately soft.

One aspect of the method for manufacturing an electric storage apparatus according to the present invention may have a configuration, in which, in the joining step, a vibration tool that has a contact surface capable of contacting the first metal member and causes ultrasonic vibration to act upon the first metal member is used, and the contact surface is constituted by one or a plurality of projections.

According to such a configuration, since the Vickers hardness of the first metal member is appropriately set, it is possible to prevent damage of the first metal member as much as possible, in the case of using the vibration tool having a contact surface with a projecting shape, by avoiding application of excess energy of ultrasonic vibration to the first metal member. A specific description is given below.

In the case of performing ultrasonic welding using a vibration tool having a contact surface (for example, the leading end of a horn) with the first metal member that is in the form of one or a plurality of projections, it is difficult to transfer the projecting shape of the vibration tool to the first metal member if the first metal member has a high hardness. Therefore, at the initial stage of ultrasonic welding, the surface of the first metal member on the metal foil side is almost flat. Further, in the case where the projecting shape has not been completely transferred to the first metal member, it is also difficult to transfer the projecting shape to the metal foil located further thereinside. Therefore, the surface of the metal foil is also almost flat. Accordingly, at the initial stage of ultrasonic welding, a slip occurs on at least one of the contact surface between the first metal member and the metal foil, the contact surface of the metal foil with itself, and the contact surface between the metal foil and the second metal member, as a result of which the degree of transmission of ultrasonic vibration decreases.

Thereafter, ultrasonic welding is continued, and the projecting shape of the vibration tool is gradually transferred to the first metal member. This increases the degree of transmission of energy of the ultrasonic vibration to the first metal member or the metal foil, thereby increasing the contribution thereof to energy for joining. That is, the transfer of the projecting shape to the first metal member changes the degree of transmission of energy of ultrasonic vibration from a small degree to a large degree.

In this way, energy of ultrasonic vibration from the vibration tool does not effectively contribute to the joining, and the time required for the first metal member and others to be reliably joined by ultrasonic welding increases. This leads to application of excess energy of ultrasonic vibration to the first metal member.

In contrast, when the first metal member has an appropriately low hardness (being soft), the projecting shape of the vibration tool is easily transferred to the first metal member. Therefore, from the initial stage of ultrasonic welding, the projecting shape of the vibration tool is transferred to the first metal member. Thus, energy of ultrasonic vibration is effectively transmitted to the first metal member and the metal foil, thereby effectively contributing to energy for joining.

Accordingly, the time required for the first metal member and others to be reliably joined by ultrasonic welding can be shortened. As a result, application of excess energy of ultrasonic vibration to the first metal member is prevented.

The aforementioned phenomenon occurs either in the case of one projection or in the case of a plurality of projections being provided in the vibration tool.

The aforementioned relationship is explained by way of a specific experimental example.

Figure 10:
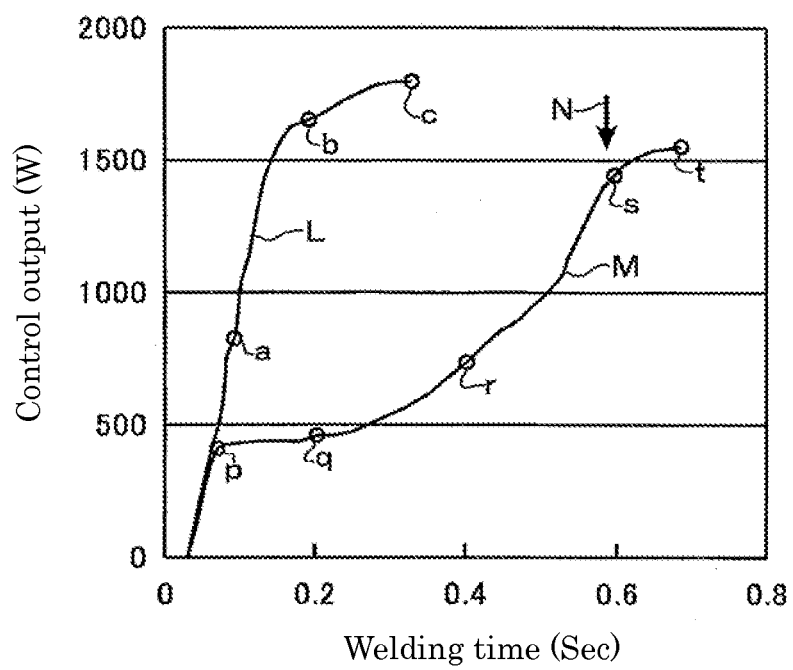
FIG. 10 is a graph showing output characteristics of ultrasonic welding.

FIG. 10 exemplifies the relationship between welding time and control output when an auxiliary plate, which is formed by bending a thin plate-shaped metal member, sandwiching a bundled metal foil is ultrasonically welded to a current collector. That is, FIG. 10 exemplifies the case where the first metal member and the second metal member are composed of a single thin plate-shaped metal member, and ultrasonic vibration is caused to act from the first metal member side located opposite to the current collector side with the metal foil interposed therebetween.

The "control output" on the vertical axis in FIG. 10 is the output (power) required for the leading end of the horn that causes ultrasonic vibration to act upon the first metal member to vibrate while maintaining a specific amplitude. The relationship is such that, as the load applied from the first metal member side to the leading end of the horn increases, the aforementioned control output also increases.

FIG. 10 shows the experimental results of the first metal member formed of C1020-O (material code prescribed in JIS H 3100) (soft material) by the curve L. Here, C1020 is copper having a purity of 99% or higher. Specifically, it is prescribed as follows. C1020 contains more than 99.96% of Cu in terms of mass fraction.

Further, FIG. 10 also shows the experimental results of the first metal member formed of C1020-1/4H (hard material) by the curve M. Here, C1020-O has a Vickers hardness of 50 Hv, and C1020-1/4H has a Vickers hardness of 85 Hv.

In the measurement results shown by the curve M, which use the first metal member having a high Vickers hardness, the control output rises up to the point "p", and thereafter does not rises as much to the point "q". This means that a slip has occurred between the first metal member and the metal foil, and thus the load applied to the leading end of the horn has not increased.

Thereafter, the transfer of the projecting shape of the leading end of the horn to the first metal member proceeds, and the load applied to the leading end of the horn increases up to the point "r" and the point "s" (that is, ultrasonic welding proceeds). Thus, welding is completed at the point "t".

On the other hand, in the measurement results shown by the curve L, which use the first metal member having a low Vickers hardness, the load applied to the leading end of the horn rapidly rises from the point "a" to the point "b". This indicates that the transfer of the projecting shape of the leading end of the horn to the first metal member and ultrasonic welding rapidly proceed from the initial stage of ultrasonic welding.

As is obvious from the comparison shown in FIG. 10 between the characteristics of the curve L and the characteristics of the curve M, in the first metal member having a high Vickers hardness, the time required to achieve the completion of welding at the point "t" increases due to the delay of the transfer of the projecting shape at the initial stage of ultrasonic welding or the subsequent reduction in the increasing degree of control power. This causes application of excess energy of ultrasonic vibration to the first metal member having a high Vickers hardness. As a result, cracks have occurred in the first metal member having a high Vickers hardness at the point (time) shown by the arrow N in FIG. 10.

In contrast, in the first metal member having a low Vickers hardness, the time required to achieve the completion of welding at the point "c" is short, and thus the applied energy of ultrasonic vibration is effectively used for joining. Therefore, damage such as cracks does not occur.

Another aspect of the method for manufacturing an electric storage apparatus according to the present invention may have a configuration, in which end edges of the first metal member and the second metal member are coupled to each other by a joining section, and in the sandwiching step, the metal foil is sandwiched between the first metal member and the second metal member so as to have an end edge that is in contact with the joining section.

According to such a configuration, the metal members located on both sides of the metal foil to be welded can be handled as a single-piece member, and the metal foil to be welded can be positioned relative to the first metal member and the second metal member using the aforementioned joining section. A specific description is given below.

Since the first metal member and the second metal member are connected by the presence of the joining section, metal members located on both sides of the metal foil to be welded can be treated as a single-piece member. In addition, the metal foil to be welded, the first metal member and the second metal member can be positioned in place by utilizing the joining section.

When the first metal member and the second metal member serving as a single-piece member are attached to the metal foil to be welded, the single-piece member and the metal foil can be positioned in place by arranging the leading end of the metal foil so as to be placed against the inner side of the joining section. As a result, it is easy to relatively position the metal foil, the first metal member and the second metal member in place and set positions for ultrasonic vibration to act upon.

Further, an electric storage apparatus according to the present invention includes an electric storage element including: an electrode plate that has a metal foil extending on one end side and is formed by being stacked in a layered manner; and an auxiliary plate for ultrasonic welding that has a plurality of joining portions joined to the metal foil by ultrasonic vibration and is placed against the bundled metal foil, wherein the auxiliary plate has a Vickers hardness of at least 40 Hv and not more than 75 Hv.

According to such a configuration as described above, damage to an auxiliary plate for ultrasonic welding used to protect the metal foils of the electrode assembly can be prevented when the metal foils are welded by means of ultrasonic welding. Thus, it is possible to improve the quality of the electric storage apparatus.

Hereinafter, embodiments of an electric storage apparatus to which the present invention is applied will be described with reference to the accompanying drawings.

In this embodiment, a battery cell, particularly a nonaqueous electrolyte secondary cell (more specifically, a lithium-ion battery cell) which is one example of secondary battery cells will be cited and described as an example of an electric storage apparatus.

[Configuration of Secondary Battery Cell]

As shown in the perspective view of FIG. 1, a nonaqueous electrolyte secondary battery cell RB of the present embodiment includes a cell housing BC (hereinafter simply referred to as "housing BC"). The housing BC includes a bottomed cylindrical (more specifically, bottomed rectangularly cylindrical) can body 1, and a cover part 2 overlaid on the open surface of the can body 1. The housing BC is configured by overlaying the cover part 2 on the open surface of the can body 1 and welding the cover part 2 thereto. The cover part 2 is formed from a reed-shaped rectangular plate material. A terminal bolt 5 which is the electrode terminal of a positive electrode and a terminal bolt 7 which is the electrode terminal of a negative electrode are fitted onto the surface of the cover part 2 on the outer side of the housing BC.

The can body 1 is a flattened rectangular parallelepiped conformable to the shape of the cover part 2. Accordingly, the housing BC as a whole has a flattened substantially rectangular parallelepiped shape.

Figure 2:
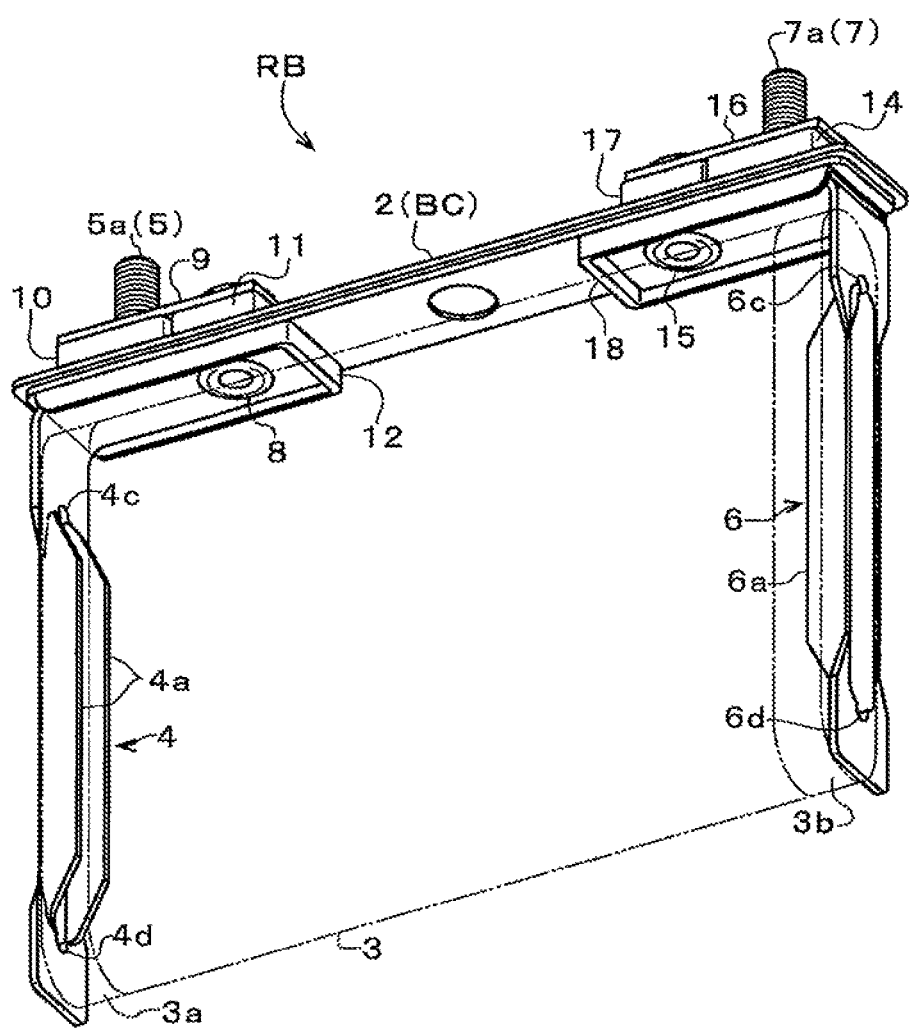
FIG. 2 is a perspective view showing the internal configuration of the electric storage apparatus according to the embodiment of the present invention.

In FIG. 2, an electric storage element 3 and plate-shaped current collectors 4 and 6 schematically shown by double-dot chain lines are housed on the inner side of the housing BC. FIG. 2 is a perspective view of the inner side of the housing BC taken by looking up the housing BC from the lower side thereof with the can body 1 excluded.

The current collectors 4 and 6 are members used to electrically connect the electric storage element 3 and the terminal bolts 5 and 7.

Note that in the present embodiment, the electric storage element 3 will hereinafter be referred to as "power generating element 3," since the secondary battery cell RB is cited as an example of the electric storage apparatus.

Both the current collector 4 and the current collector 6 are electrical conductors and have substantially the same shape. These current collectors 4 and 6 are disposed symmetrically. The materials of the current collector 4 and the current collector 6 differ from each other. The positive electrode-side current collector 4 is formed from aluminum, whereas the negative electrode-side current collector 6 is formed from copper.

The current collectors 4 and 6 are formed by bending plate-shaped members made from the above-mentioned metal materials into a predetermined shape. The current collectors 4 and 6 include a horizontally-positioned portion and a vertically-positioned portion and have a substantially L-shaped bent form in which these horizontally and vertically-positioned portions line up. The horizontally-positioned portion extends along the surface of the cover part 2 which is a surface where the terminal bolts 5 and 7 are disposed. The vertically-positioned portion bends 90° downward (to the opposite side of the surface on which the terminal bolts 5 and 7 are present) in the vicinity of the end portion of the cover part 2 in the longitudinal direction thereof, and extends in the normal-line direction of the surface of the cover part 2 on the inner side of the housing BC. Connecting portions 4a and 6a used to connect to the power generating element 3 are formed by bending parts of the vertically-positioned portions toward the power generating element 3 side. The connecting portions 4a and 6a are formed as described below. A pair of upper and lower through-holes 4c and 4d and a pair of upper and lower through-holes 6c and 6d are formed in the vertically-positioned portions of the current collectors 4 and 6 in a state of being flat plates. In addition, insections are formed between the through-holes 4c and 4d and between the through-holes 6c and 6d. Then, the insections are extruded by means of pressing or the like to form the connecting portions 4a and 6a.

The current collectors 4 and 6 have a narrow rectangular shape in conformity with the flattened shape of the housing BC. The current collectors 4 and 6 as a whole are bend-formed while being positioned along the side surface of the housing BC on the short side thereof.

The power generating element 3 is a so-called winding-type power generating element. The power generating element 3 is composed mainly of an electrode assembly. The electrode assembly includes a foil-shaped electrode plate serving as a positive electrode, a foil-shaped electrode plate serving as a negative electrode, and a long belt-shaped separator. The foil-shaped electrode plate serving as a positive electrode is formed by coating a long belt-shaped underlying metal foil formed from aluminum with a positive-electrode active material. The foil-shaped electrode plate serving as a negative electrode is formed by coating a long belt-shaped underlying metal foil formed from copper with a negative-electrode active material. The electrode assembly has a structure in which the separator is sandwiched between the foil-shaped electrode plate serving as a positive electrode and the foil-shaped electrode plate serving as a negative electrode, and these components are wound into a flattened shape in the longitudinal direction thereof, thereby stacking a pair of the foil-shaped electrode plate serving as a positive electrode and the foil-shaped electrode plate serving as a negative electrode in a layered manner.

The electrode assembly constituting this winding-type power generating element 3 is provided with uncoated parts 3a and 3b, in each of which the underlying metal foil is exposed on one width-direction lateral end thereof for electrical connection with the current collectors 4 and 6, in the foil-shaped electrode plates serving as positive and negative electrodes, respectively. The positive electrode-side uncoated part 3a and the negative electrode-side uncoated part 3b are located on the opposite side of each other across the widths thereof. In the state of being wound as described above, the positive electrode-side uncoated part 3a extends outward from one end side of the power generating element 3 in the winding axis direction thereof (width direction of the foil-shaped electrode plate). Likewise, the negative electrode-side uncoated part 3b extends outward from the other end side (opposite side of the uncoated part 3a) of the power generating element 3 in the winding axis thereof (width direction of the foil-shaped electrode plate).

The power generating element 3 and the current collectors 4 and 6 are joined as described below. Overlapped portions of the uncoated part 3a of the power generating element 3 which is the metal foil extending outward from the foil-shaped electrode plate serving as a positive electrode are bundled and joined together with the current collector 4 by means of ultrasonic welding. Likewise, overlapped portions of the uncoated part 3b of the power generating element 3 which is the metal foil extending outward from the foil-shaped electrode plate serving as a negative electrode are bundled and joined together with the current collector 6 by means of ultrasonic welding.

Note however that not only the above-described bundled portions of the metal foils and the current collectors 4 and 6 are ultrasonic-welded. The above-described bundled portions of the metal foils and the current collectors 4 and 6 are ultrasonic-welded using the auxiliary plates 21 for ultrasonic welding shown in FIG. 4 and FIG. 5.

These auxiliary plates 21 for ultrasonic welding will be discussed in detail in the later-described process for manufacturing the secondary battery cell RB.

As described above, the positive electrode-side terminal bolt 5 fitted on the cover part 2 made from metal (specifically, aluminum, for example) is electrically connected to the positive electrode-side current collector 4. In addition, the negative electrode-side terminal bolt 7 fitted on the cover part 2 made from metal is electrically connected to the negative electrode-side current collector 6.

The structure of attachment of the terminal bolt 5 to the cover part 2 and the structure of coupling of the terminal bolt 5 with the current collector 4 are substantially the same as the structure of attachment of the terminal bolt 7 to the cover part 2 and the structure of coupling of the terminal bolt 7 with the current collector 6. Thus, the terminal bolts 5 and 7 are disposed symmetrically. Hereinafter, a description will be made mainly of the positive electrode-side configuration.

Figure 3:
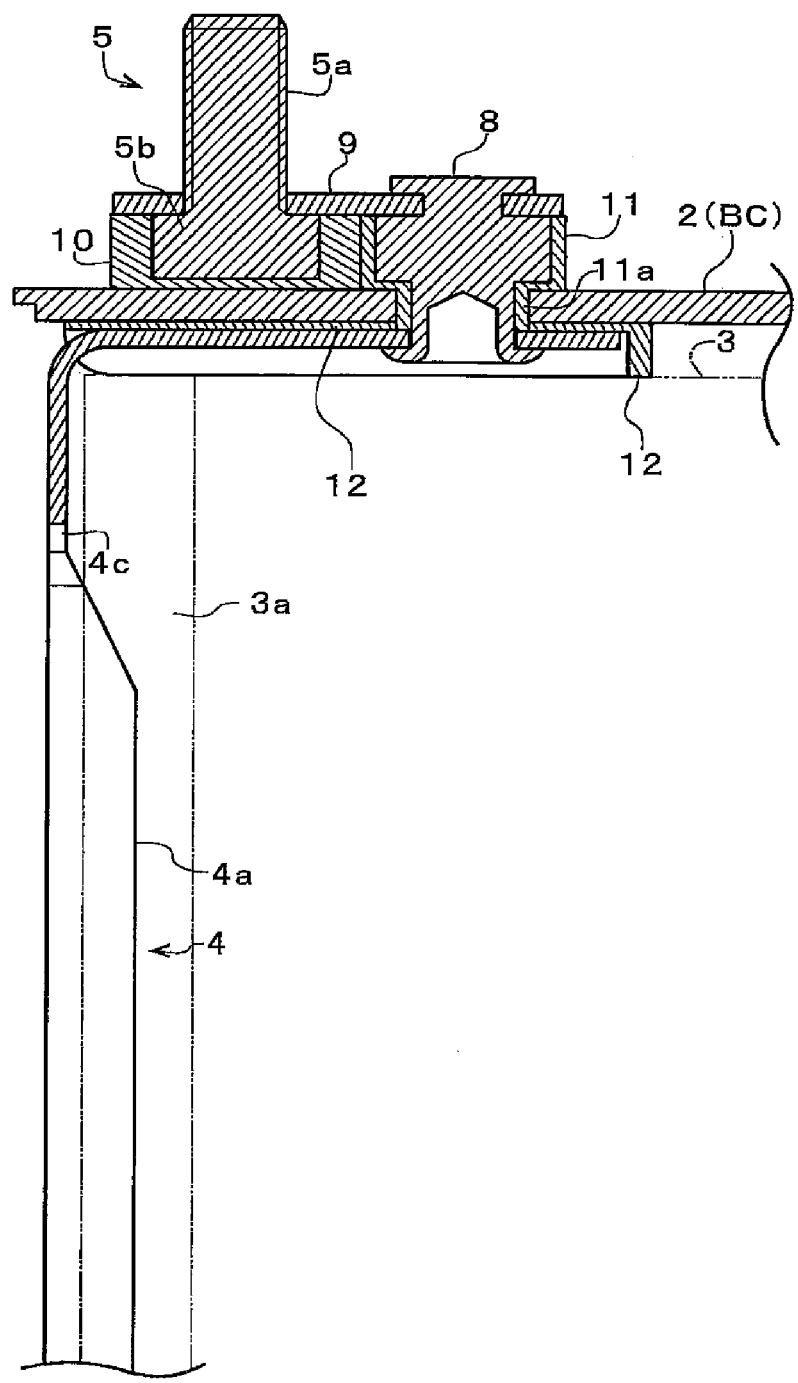
FIG. 3 is a cross-sectional view of a substantial part of the electric storage apparatus according to the embodiment of the present invention.

As shown in the cross-sectional view of FIG. 3, the terminal bolt 5 is electrically connected to the current collector 4 through a rivet 8 and a metal plate 9. The rivet 8 is made from a metal material. More specifically, the positive electrode-side rivet 8 is made from aluminum like other positive electrode-side metal members. The metal plate 9 is made from, for example, nickel-plated copper.

The head of the rivet 8 fixes the metal plate 9 by tucking down the metal plate 9.

A retaining frame 10 is disposed on the cover part 2. The retaining frame 10 is open on the upper surface side thereof and includes a dish-shaped concave portion conformable to the shape of a head 5b of the terminal bolt 5 (rectangular shape in the example of the present embodiment). The head 5b of the terminal bolt 5 mates with the concave portion to prevent the terminal bolt 5 from rotation.

The retaining frame 10 is formed from resin which is an electrical insulating material to ensure electrical insulation between the terminal bolt 5 and the cover part 2.

In a current path from the current collector 4 to the terminal bolt 5, electrical insulation with respect to the cover part 2 is ensured by an upper gasket 11 and a lower gasket 12. In addition, the current path from the current collector 4 to the terminal bolt 5 is hermetically sealed up with the upper gasket 11 and the lower gasket 12 at a location of the cover part 2 where the rivet 8 penetrates therethrough. Both the upper gasket 11 and the lower gasket 12 are formed from an electrical insulating material (more specifically, resin) and serve as sealing members.

The upper gasket 11 has a structure in which a tubular part 11a to be fitted into an opening of the cover part 2 is attached to the bottom portion of a dish-shaped rectangular parallelepiped container open on the upper portion thereof. The upper gasket 11 holds the rivet 8 at a location thereof near the head with the dish-shaped rectangular parallelepiped container. In addition, the rivet 8 is fitted into the inner space of the tubular part 11a.

Under the condition of the terminal bolt 5 and the like being fitted on the cover part 2, the bottom portion of the upper gasket 11 is sandwiched between the head of the rivet 8 and the cover part 2.

Under the condition of the current collector 4 and the like being fitted on the cover part 2, the lower gasket 12 is sandwiched between the horizontally-positioned portion of the current collector 4 and the cover part 2.

The rivet 8 is swaged while being made to penetrate through the tubular part 11a of the upper gasket 11, the cover part 2, the lower gasket 12, and the horizontally-positioned portion of the current collector 4. Consequently, the rivet 8 fixes the horizontally-positioned portion of the current collector 4 on the cover part 2 and electrically connects the current collector 4 and the metal plate 9. As a result, the current collector 4 and the terminal bolt 5 are electrically connected to each other.

As shown in the perspective view of FIG. 2, the negative electrode-side configuration is symmetrical in arrangement with the positive electrode-side configuration across the center of the cover part 2. On the outer side of the housing BC, a retaining frame 14 disposed on the cover part 2 holds the head of the terminal bolt 7, and a metal plate 16 fixed on the rivet 15 electrically connects the rivet 15 and the terminal bolt 7.

The rivet 15 is swaged with the head thereof held on the upper gasket 17, while tucking down the upper gasket 17, the cover part 2, the lower gasket 18 and the current collector 6.

Like the current collector 6, the rivet 15 is made from copper and electrically connects the current collector 6 and the terminal bolt 7 through the metal plate 16.

[Manufacturing Process of Secondary Battery Cell RB]

Next, a process for manufacturing the secondary battery cell RB will be described with a focus on the assembly of the power generating element 3.

The foil-shaped electrode plate of the positive electrode is fabricated by, for example, coating a positive electrode active material layer of lithium iron phosphate or the like on both the front and back sides of a long belt-shaped aluminum (specifically, made of A1085 (material code prescribed in JIS H4000)) underlying metal foil, and then performing press working or the like on the metal foil. A1085 is aluminum having a purity of 99% or more. Specifically, it is prescribed as follows. A1085 contains 0.10% or less of Si, 0.12% or less of Fe, 0.03% or less of Cu, 0.02% or less of Mn, 0.02% or less of Mg, 0.03% or less of Zn, 0.03% or less of Ga, 0.05% or less of V, 0.02% or less of Ti, and 99.85% or more of Al, in terms of mass fraction.

As described above, an exposed area where the belt-shaped underlying metal layer is exposed without being coated with the positive-electrode active material is formed on one end in the width direction. This exposed area serves as the uncoated part 3a.

The foil-shaped electrode plate of the negative electrode is fabricated by, for example, coating a negative-electrode active material layer of graphite or the like on both the front and back sides of a long belt-shaped copper (specifically, C1020-1/4H (material code prescribed in JIS H 3100)) underlying metal foil, and then performing press working or the like on the metal foil.

Also in the case of the foil-shaped electrode plate of the negative electrode, an exposed area where the belt-shaped underlying metal layer is exposed without being coated with the negative-electrode active material is formed on one end in the width direction. This exposed area serves as the uncoated part 3b.

The foil-shaped electrode plate of the positive electrode having a predetermined length and the foil-shaped electrode plate of the negative electrode having a predetermined length are wound around a flat plate-shaped winding axis with a separator sandwiched therebetween. At this time, the foil-shaped electrode plate of the positive electrode, the foil-shaped electrode plate of the negative electrode, and the separator are positioned in place, so that the uncoated part 3a protrudes to one side of the winding axis direction, whereas the uncoated part 3b protrudes to the other side of the winding axis direction.

In the power generating element 3, the separator is wound on the outermost circumference.

Figure 4:
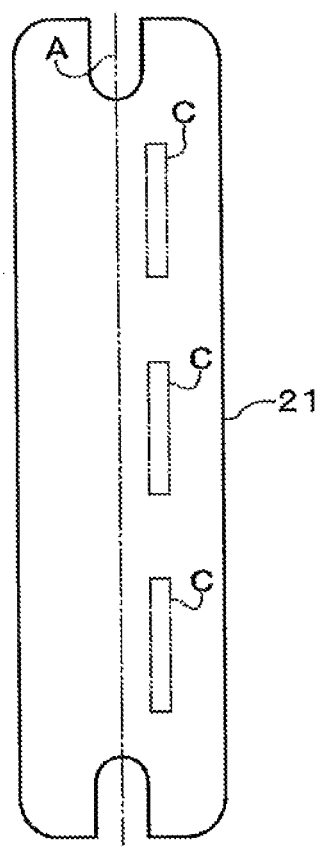
FIG. 4 is an enlarged view of an auxiliary plate for ultrasonic welding according to the embodiment of the present invention in an unfolded state.
Figure 5:
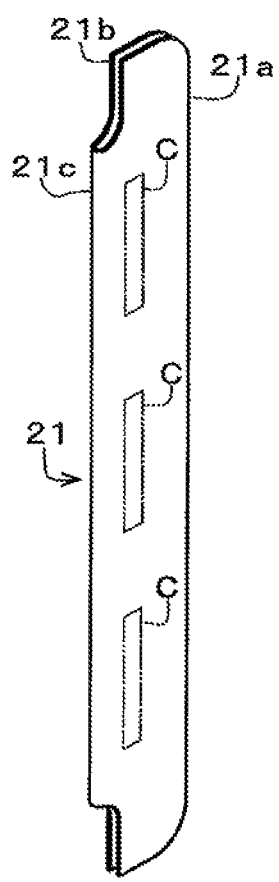
FIG. 5 is an enlarged perspective view of the auxiliary plate for ultrasonic welding according to the embodiment of the present invention.

Next, as a preliminary arrangement for ultrasonic-welding the uncoated parts 3a and 3b and the connecting portions 4a and 6a of the current collectors 4 and 6, the auxiliary plates 21 for ultrasonic welding shown in FIG. 4 and FIG. 5 are attached to the uncoated parts 3a and 3b.

As shown in FIG. 5, each auxiliary plate 21 includes a pair of metal members 21a and 21b disposed oppositely to each other, and a joining section 21c for coupling end edges of this pair of metal members 21a and 21b with each other.

The respective auxiliary plates 21 sandwich the bundled portions of the uncoated parts 3a and 3b by the pair of metal members 21a and 21b and are thus attached to the uncoated parts 3a and 3b.

In the ultrasonic welding of the uncoated parts 3a and 3b and the like, ultrasonic vibration is caused to act upon the metal member 21a of the pair of metal members 21a and 21b thus attached.

For convenience of description, the metal member 21a of the pair of metal members 21a and 21b upon which ultrasonic vibration is caused to act is hereinafter referred to as "first metal member," whereas the other metal member 21b is referred to as "second metal member."

The auxiliary plate 21 attached to the positive electrode-side uncoated part 3a and the auxiliary plate 21 attached to the negative electrode-side uncoated part 3b are formed into almost the same shape. The auxiliary plates 21 attached to the positive electrode-side uncoated part 3a are made from aluminum that is the same material as the uncoated portion 3a.

The auxiliary plate 21 for ultrasonic welding attached to the negative electrode-side uncoated portion 3b is made from copper like the uncoated portion 3b. The negative electrode-side uncoated portion 3b is formed of a copper plate (specifically, made of C1020-O (material code prescribed in JIS H 3100)) that has not been subjected to work hardening. Therefore, the negative electrode-side uncoated portion 3b has a Vickers hardness of at least 40 Hv and not more than 75 Hv. This is for preventing damage of the auxiliary plates 21 in ultrasonic welding. A specific description will be given below. The "Vickers hardness" herein is an index showing the surface hardness of a member. The Vickers hardness can be measured, using a test method prescribed as the Vickers hardness test in JIS Z 2244, at the center of the point to be ultrasonically welded on the surface of a target member. Specifically, the Vickers hardness can be determined by pressing a diamond quadrangular pyramid indenter against a surface of a test piece to produce an indentation, measuring a diagonal line of the indentation to determine the surface area of the indentation, and dividing the pressing force by the surface area.

The first metal member 21a, the second metal member 21b, and the joining section 21c which are constituent elements of the auxiliary plate 21 are formed from a single thin plate-shaped metal member. The thin plate-shaped metal member (an aluminum plate for the positive electrode and a copper plate for the negative electrode) is processed into the shape shown in FIG. 4. This processed member is then double-folded on a center line A shown in FIG. 4 to form the member into the shape shown in FIG. 5. The auxiliary plate 21 formed by double-folding this thin metal plate member is configured to sandwich the bundled uncoated portion 3a or 3b thereinside.

Figure 7:
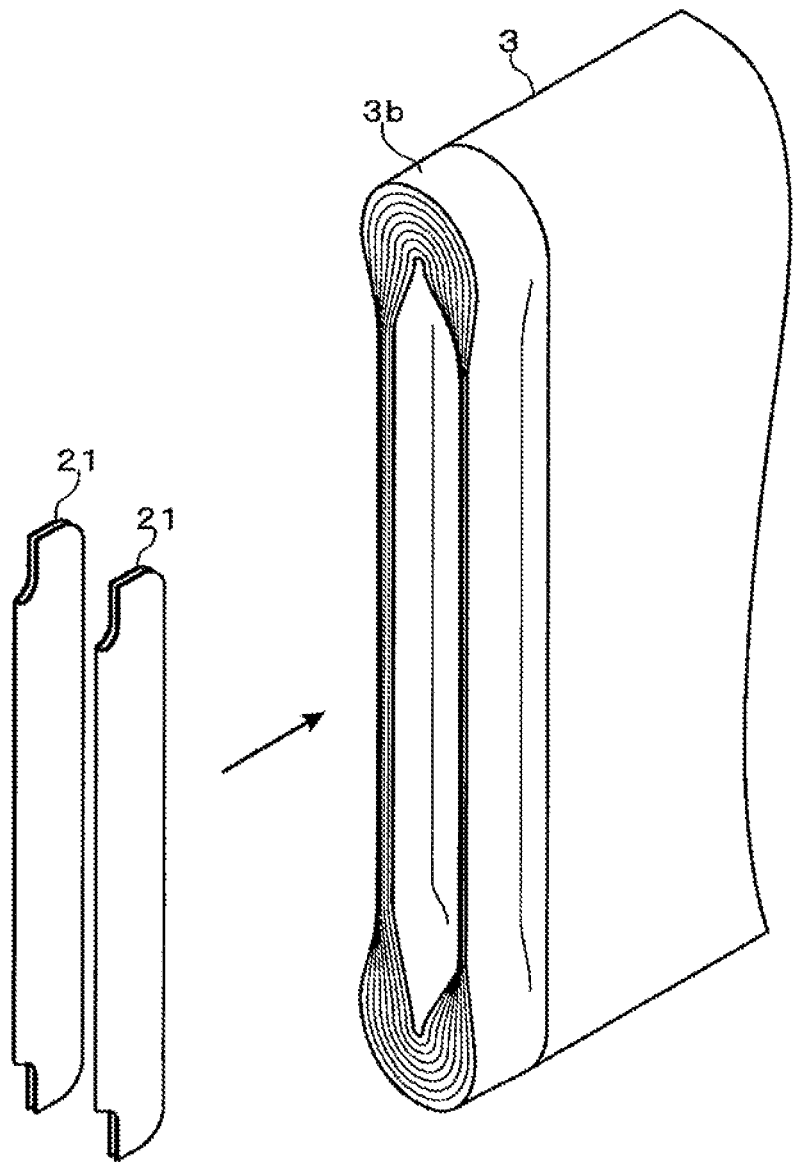
FIG. 7 is a perspective view showing the work of assembling an electric storage element according to the embodiment of the present invention, before auxiliary plates are attached.
Figure 8:
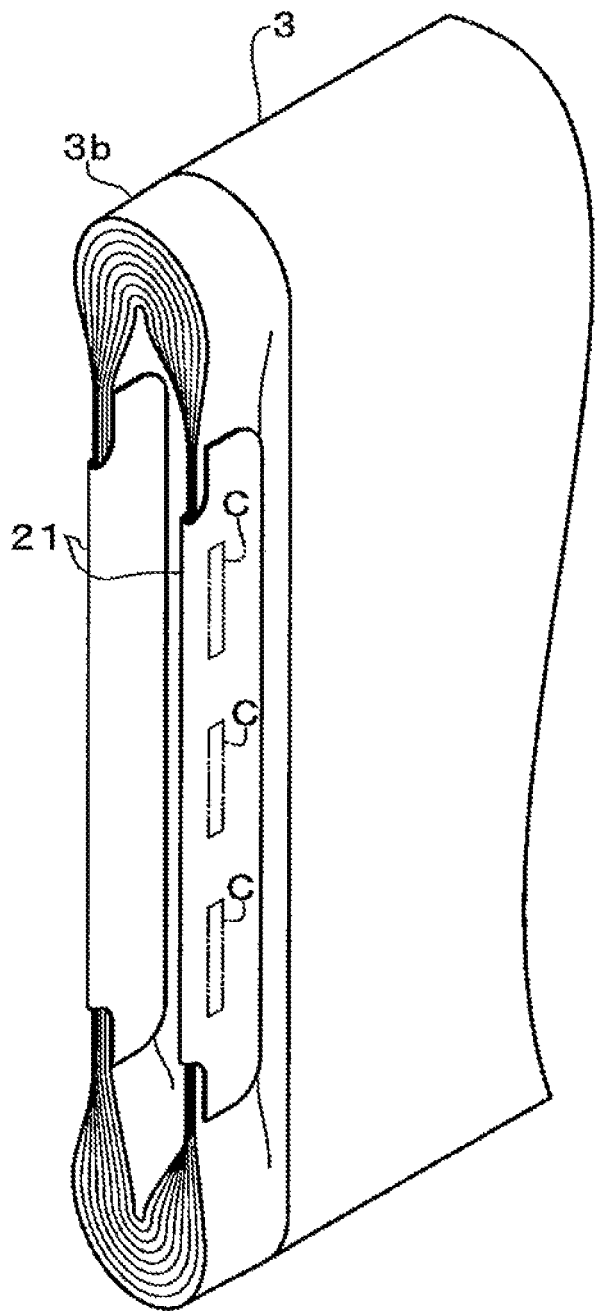
FIG. 8 is a perspective view showing the work of assembling the electric storage element according to the embodiment of the present invention after the electric storage element is fitted with the auxiliary plates.

A description will be made of a mode for attaching the auxiliary plates 21 to, for example, the negative electrode-side uncoated parts 3a and 3b. In the power generating element 3 wound into a flattened shape, the uncoated part 3b is unfolded into two bundles by applying a pushing, widening force to the flattened uncoated part from the center in the width direction to the left and right sides thereof, as shown in FIG. 7. Then, each of the two bundles is sandwiched with an auxiliary plate 21, as shown in FIG. 8. At this time, an end edge of the uncoated part 3b is placed against the inner side of the joining section 21c to position the auxiliary plate 21 in place, and the auxiliary plate 21 is attached to have the end edge of the uncoated part 3b abutting on the joining section 21c.

In addition, the two auxiliary plates 21 are crimped and firmly fixed on the uncoated part 3b. Consequently, the auxiliary plates 21 are solidly placed against welding surfaces of the uncoated part 3b which is a foil-shaped object to be welded. A surface of the first metal member 21a on the opposite side of a surface thereof in contact with the uncoated part 3b is a surface upon which ultrasonic vibration acts.

Also on the positive electrode side, two auxiliary plates 21 are attached to the uncoated part 3a in the same way as described above.

On the positive electrode side of a subassembly on the cover part 2 side, the metal plate 9 fitted on the rivet 8 is disposed with the threaded portion 5a of the terminal bolt 5 held in the retaining frame 10 penetrating through the metal plate 9. In addition, the rivet 8 is assembled in the cover part 2, while penetrating through the upper gasket 11, the cover part 2, the lower gasket 12 and the current collector 4, and is fixed by swaging the end portion of the rivet 8 on the inner side of the housing BC.

Also on the negative electrode side, the metal plate 16 fitted on the rivet 15 is disposed with the threaded portion 7a of the terminal bolt 7 held in the retaining frame 14 penetrating through the metal plate 16. In addition, the rivet 15 is assembled in the cover part 2, while penetrating through the upper gasket 17, the cover part 2, the lower gasket 18 and the current collector 6, and is fixed by swaging the end portion of the rivet 15 on the inner side of the housing BC.

Note that although the connecting portions 4a and 6a have already been formed in the current collectors 4 and 6 under this condition, the current collectors 4 and 6 do not have an L-shaped bent form. That is, locations of the current collectors 4 and 6 where the connecting portions 4a and 6a are formed (locations to serve as the above-mentioned vertically-positioned portions) also have a substantially linear shape extending along the longitudinal direction of the cover part 2.

Figure 9:
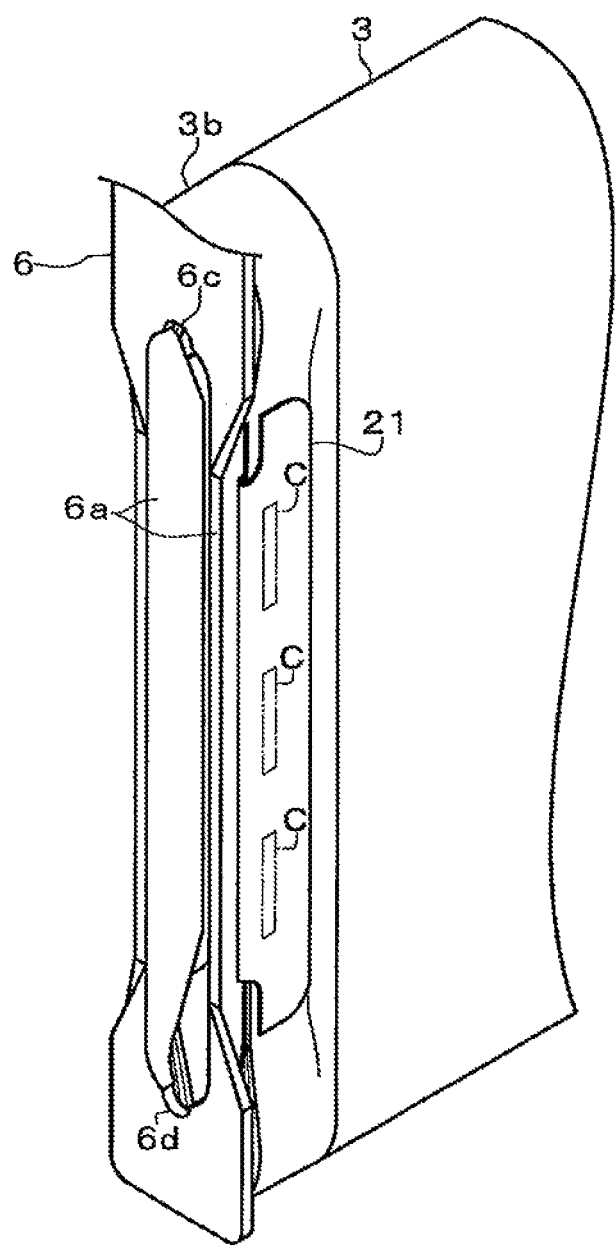
FIG. 9 is a perspective view showing the work of assembling the electric storage element according to the embodiment of the present invention after the electric storage element is fitted with a current collector.

As described above, the power generating element 3 fitted with the auxiliary plates 21 is disposed immediately underneath a surface of the subassembly on the cover part 2 side on which the lower gaskets 12 and 18 are fitted. At this time, the power generating element 3 is disposed so that the winding axis of the foil-shaped electrode plate is parallel with the longitudinal direction of the cover part 2 and flat surfaces of the power generating element 3 are positioned orthogonally to the cover part 2. Next, the positive and negative current collectors 4 and 6 are bent into an L-shape, as shown in FIG. 2, and the connecting portions 4a and 6a are fitted into a space between the pair of auxiliary plates 21, as shown in FIG. 9. Note that although FIG. 9 shows only the negative electrode side correspondingly to, for example, FIG. 7, the positive electrode side is the same in layout as the negative electrode side.

Under the condition of the subassembly on the cover part 2 side and the power generating element 3 being assembled in this way, the uncoated parts 3a and 3b of the power generating element 3 and the connecting portions 4a and 6a of the current collectors 4 and 6 are joined by means of ultrasonic welding.

At the time of this ultrasonic welding, ultrasonic vibration is applied from the auxiliary plate 21 side to weld the auxiliary plates 21 into which the uncoated parts 3a and 3b are inserted and the connecting portions 4a and 6a of the current collectors 4 and 6, while placing the respective auxiliary plates 21 and the connecting portions 4a and 6a against each other.

Figure 6:
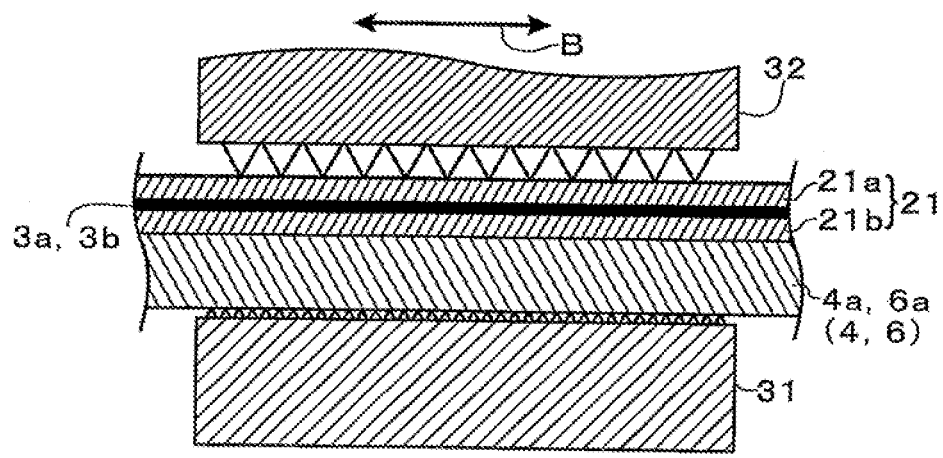
FIG. 6 is a cross-sectional view showing ultrasonic welding work according to the embodiment of the present invention.

Specifically, as shown in FIG. 6 showing an approximate arrangement at the time of ultrasonic welding, an anvil 31 is placed against the current collectors 4 and 6, and the leading end portion 32 of the horn that is a vibration tool for applying ultrasonic vibration is placed against surfaces of the auxiliary plates 21 on the opposite side of surfaces thereof in contact with the current collectors 4 and 6 (front surface of the first metal member 21a). Then, ultrasonic vibration is applied along a direction (longitudinal direction of the uncoated parts 3a and 3b) shown by a double-headed arrow B in FIG. 6 with the uncoated parts 3a and 3b sandwiched between the auxiliary plates 21 and the current collectors 4 and 6.

That is, the auxiliary plates 21 and the current collectors 4 and 6 are joined, with the auxiliary plates and the current collectors placed in contact with each other, by applying ultrasonic vibration from a side surface (front surface of the first metal member 21a) positioned on a side surface of a pair of side surfaces of bend-formed auxiliary plates 21 on the opposite side of the surface on which the current collectors 4 and 6 are present.

A surface of the leading end portion 32 of the horn in contact with the auxiliary plates 21 has a thin, long rectangular shape extending in the direction shown by the double-headed arrow B in FIG. 6. The leading end portion 32 of the horn is placed against the auxiliary plates 21, while being positioned so that the longitudinal direction of the leading end portion 32 of the horn coincides with the longitudinal direction of the uncoated parts 3a and 3b of the flat surfaces of the power generating element 3. Sites of the auxiliary plates 21 on which ultrasonic vibration acts are shown by double-dot chain lines C in FIG. 4, FIG. 5 and FIG. 9. After ultrasonic welding, welding marks remain in places shown by the double-dot chain lines C.

The contact surface of the leading end 32 of the horn with the auxiliary plate 21 and the contact surface of the anvil 31 with the current collector 4 or 6 are each formed into a so-called knurled pattern (knurling) in which a plurality of square pyramid projections are arrayed, as schematically shown in FIG. 6. The projections on the leading end 32 of the horn are larger than the projections on the anvil 31 side.

In FIG. 4 and FIG. 5, for example, sites of action of ultrasonic vibration shown by double-dot chain lines C are set in a plurality of places (three places in the present first embodiment) for each auxiliary plate 21. In the embodiment shown in FIG. 6, the uncoated portion 3a or 3b is joined to the current collector 4 or 6 by ultrasonically welding the sites of action of ultrasonic welding in order in the auxiliary plate 21.

At this time, deformations due to ultrasonic welding around adjacent sites of action of ultrasonic vibration of the auxiliary plate 21 attached to the uncoated portion 3b on the negative electrode side become superimposed on each other in their midst from the sites of action on both sides, so that the deformations become significant.

As described above, the auxiliary plates 21 attached to the negative electrode-side uncoated portion 3b each have a Vickers hardness of at least 40 Hv and not more than 75 Hv. Therefore, even in the case of significant deformation due to ultrasonic welding, the occurrence of damage such as cracks can be prevented.

Such prevention of damage in the auxiliary plates 21 is described by way of a specific experimental example.

Figure 11:
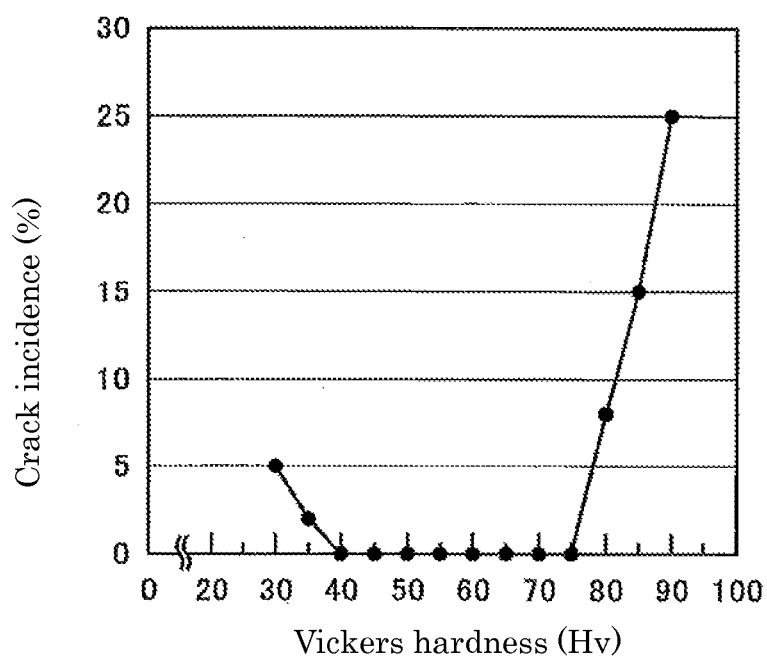
FIG. 11 is a graph showing the relationship between hardness of auxiliary plates for ultrasonic welding and crack incidence.

Copper auxiliary plates 21 to be attached to the negative electrode-side uncoated portion 3b are prepared. Specifically, 100 pieces of auxiliary plates 21 formed by varying the Vickers hardness of copper plates are prepared for each hardness. Then, the auxiliary plates 21, the uncoated portion 3b, and the current collector 6 are ultrasonically welded together in the same manner as the aforementioned assembly method. The occurrence of damage such as cracks in the auxiliary plates 21 as a result of this is shown in FIG. 11. In FIG. 11, the horizontal axis indicates Vickers hardness, and the vertical axis indicates incidence of damage such as cracks. Here, the incidence of damage such as cracks shows the number of pieces in which damage such as cracks occurred out of 100 pieces of auxiliary plates 21.

As is obvious from FIG. 11, when the Vickers hardness is 40 Hv or more and 75 Hv or less, the crack incidence is "0%". This indicates that, even if the deformations as mentioned above occur in the auxiliary plates 21, the occurrence of damage such as cracks can be prevented.

On the other hand, when the Vickers hardness is less than 40 Hv, the auxiliary plates 21 are excessively soft, and damage such as cracks occurs around the sites of action of ultrasonic vibration. This is probably because the auxiliary plates 21 have deformed more than necessary by compression due to welding.

As described above, the power generating element 3 in which ultrasonic welding of two auxiliary plates 21 on each of the positive electrode side and the negative electrode side has been completed is assembled. Subsequently, the assembly on the cover 2 side is inserted into the can body 1, and the end edges of the cover 2 and the opening ends of the can body 1 are laser-welded.

After being made to go through the processes of injecting an electrolytic solution, initial charging, and the like, the secondary battery cell RB is brought to completion.

<Other Embodiments>

Hereinafter, other embodiments of the present invention will be enumerated. Note that the same reference numerals and characters are used for constituent elements corresponding to those of the above-described embodiment.

(1) In the above-described embodiment, a case is cited where the uncoated parts 3a and 3b are sandwiched with the auxiliary plates 21 for ultrasonic welding in which end edges of the first metal member 21a and the second metal member 21b are coupled with each other by the joining section 21c, the sandwiched components are overlapped with the connecting portions 4a and 6a of the current collectors 4 and 6, and the overlapped components are collectively ultrasonic-welded. The ultrasonic welding of the uncoated parts 3a and 3b and the like and the joining of the current collectors 4 and 6 may be performed at separate points of time, however.

Figure 12:
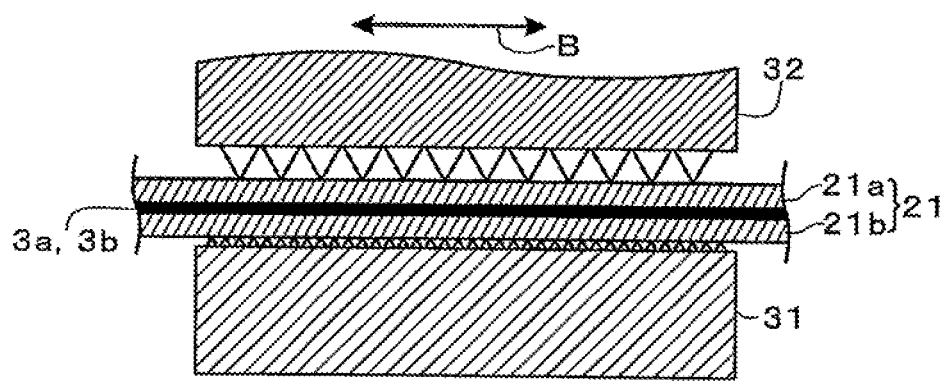
FIG. 12 is a cross-sectional view showing ultrasonic welding work according to another embodiment of the present invention.

For example, the above-described method is as follows. As shown in the cross-sectional view of FIG. 12 corresponding to FIG. 6 in the above-described embodiment, a subassembly in which the uncoated parts 3a and 3b are sandwiched with the auxiliary plates 21 for ultrasonic welding shown in the first to third embodiments and crimped, i.e., a subassembly in which the uncoated parts 3a and 3b are simply sandwiched with the first metal member 21a and the second metal member 21b constituting each auxiliary plate 21 is disposed between the leading end portion 32 of the horn and the anvil 31. Under this condition, ultrasonic welding may be performed by causing ultrasonic vibration to act upon positions shown by double-dot chain lines C in, for example, FIG. 4.

In this case, the auxiliary plates 21 are not limited to a structure in which the first metal member 21a and the second metal member 21b are coupled by the joining section 21c. The first metal member 21a upon which ultrasonic vibration is caused to act and the second metal member 21b positioned on the opposite side of the first metal member 21a across the uncoated parts 3a and 3b may be separate components.

The components welded in this way and the connecting portions 4a and 6a of the current collectors 4 and 6 may be joined by, for example, resistance-welding the auxiliary plates 21 and the connecting portions 4a and 6a of the current collectors 4 and 6.

Figure 13:
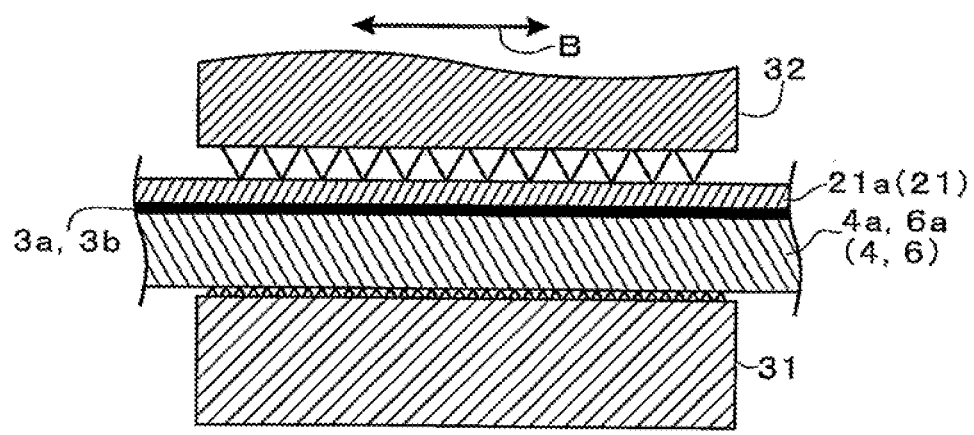
FIG. 13 is a cross-sectional view showing ultrasonic welding work according to another embodiment of the present invention.

(2) In the above-described embodiment, a case is cited where each auxiliary plate 21 formed from a thin plate-shaped metal member is double-folded, end edges of the first metal member 21a and the second metal member 21b are coupled with each other by the joining section 21c, and the uncoated parts 3a and 3b are sandwiched with the auxiliary plates 21. As shown in the cross-sectional view of FIG. 13 corresponding to FIG. 6 in the first embodiment, however, ultrasonic vibration may be caused to act upon a subassembly in which the bundled portions of the uncoated parts 3a and 3b sandwiched between the auxiliary plates 21 formed as substantially flat plate materials and the current collectors 4 and 6 from the auxiliary plate 21 side, thereby ultrasonic-welding the auxiliary plates 21 and the current collectors 4 and 6.

In this case, each auxiliary plate 21 is composed only of the first metal member 21a. In addition, the current collectors 4 and 6 serve as the second metal member for sandwiching the uncoated parts 3a and 3b along with the first metal member 21a.

(3) In the aforementioned embodiment, sites of action of ultrasonic vibration are set in three places for one auxiliary plate 21 for ultrasonic welding. Alternatively, however, the sites of action may be set in two places or four or more places.

(4) In the aforementioned embodiment, a non-aqueous electrolyte secondary battery cell RB is cited as an example of an electric storage apparatus to which the present invention is applied. The present invention is also applicable to various types of electric storage apparatuses, however, including capacitors.

(5) For the auxiliary plates 21 of the aforementioned embodiment, a copper plate that has not been subjected to work hardening (C1020-0) is used. However, the material for the auxiliary plates 21 is not limited to this. For example, materials having reduced hardness by annealing C1020-1/2H or -1/4H may be used therefor. Further, the material is not limited to C1020, and copper such as C1100 may be used therefor. Further, "0" material of copper alloy may be used therefor. Further, the material is not limited to such copper materials, as long as the Vickers hardness is at least 40 Hv and not more than 75 Hv, and aluminum alloy having comparatively high hardness such as the A5000s may be used therefor.

(6) In the aforementioned embodiment, the case where the present invention is applied to the negative electrode side is described, for example. However, the present invention can be applied to the positive electrode side in the same manner.

(7) In the aforementioned embodiment, a winding-type electric storage element 3 is cited as an example in which a long belt-shaped positive electrode-side electrode plate and a long belt-shaped negative electrode-side electrode plate are wound with a separator held therebetween. The present invention is applicable to any electric storage apparatuses, however, as long as the electric storage apparatuses are provided with an electric storage element in which a positive electrode-side electrode plate and a negative electrode-side electrode plate are stacked in a layered manner. That is, there is no limitation to the electric storage element of the wound type. For example, the present invention is also applicable to an electric storage apparatus including an electric storage element of the stack type in which a plurality of positive electrode-side electrode plates and a plurality of negative electrode-side electrode plates are alternately stacked with separators held thereamong. As another example, an electric storage element may have a configuration in which a positive electrode-side electrode plate, a negative electrode-side electrode plate, and a separator are stacked in a layered manner with at least one of these components accordion-folded.

REFERENCE SIGNS LIST

3 Electric storage element
4, 6 Current collector
21 Auxiliary plate for ultrasonic welding
21a First metal member
21b Second metal member
21c Joining section
32 Vibration tool

The invention claimed is:

1. A method for manufacturing an electric storage apparatus, comprising:
   sandwiching a metal foil extending outward from an electrode plate between a first metal member and a second metal member; and
   causing ultrasonic vibration to act upon a plurality of sites of action from a first metal member side to join the metal foil to the first metal member and the second metal member, wherein
   the first metal member has a Vickers hardness of at least 40 Hv and not more than 75 Hv.

2. The method for manufacturing an electric storage apparatus according to claim 1, wherein
   in the joining, a vibration tool that has a contact surface capable of contacting the first metal member and causes ultrasonic vibration to act upon the first metal member is used, and
   the contact surface is constituted by one or a plurality of projections.

3. The method for manufacturing an electric storage apparatus according to claim 1, wherein
   end edges of the first metal member and the second metal member are coupled with each other by a joining section, and
   in the sandwiching, the metal foil is sandwiched between the first metal member and the second metal member such that an end edge of the metal foil is in contact with the joining section.

4. An electric storage apparatus comprising:
an electric storage element comprising: an electrode assembly having a metal foil extending on one end side; and an auxiliary plate for ultrasonic welding that has a plurality of joining portions joined to the metal foil by ultrasonic vibration and is placed against the metal foil, wherein
the auxiliary plate has a Vickers hardness of at least 40 Hv and not more than 75 Hv.

* * * * *